Figure 3:
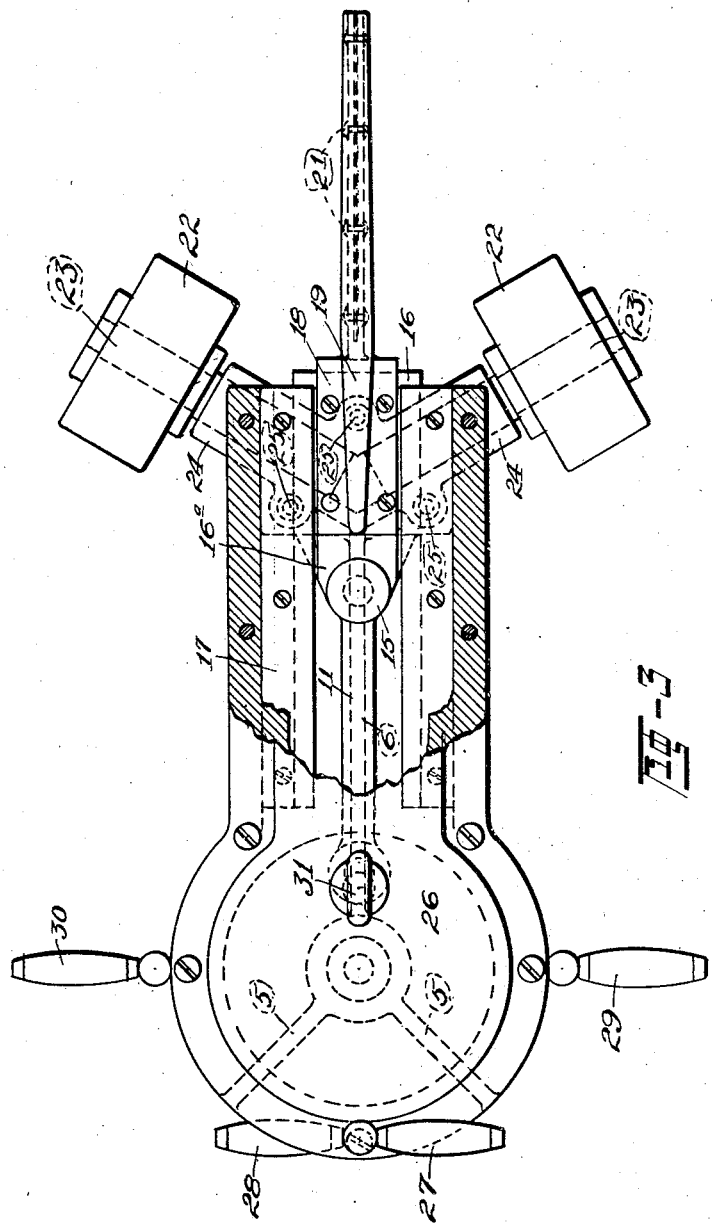

F. W. PETERS.
RECIPROCATING SAW.
APPLICATION FILED MAR. 18, 1918.
1,356,169.
Patented Oct. 19, 1920.
3 SHEETS—SHEET 1.
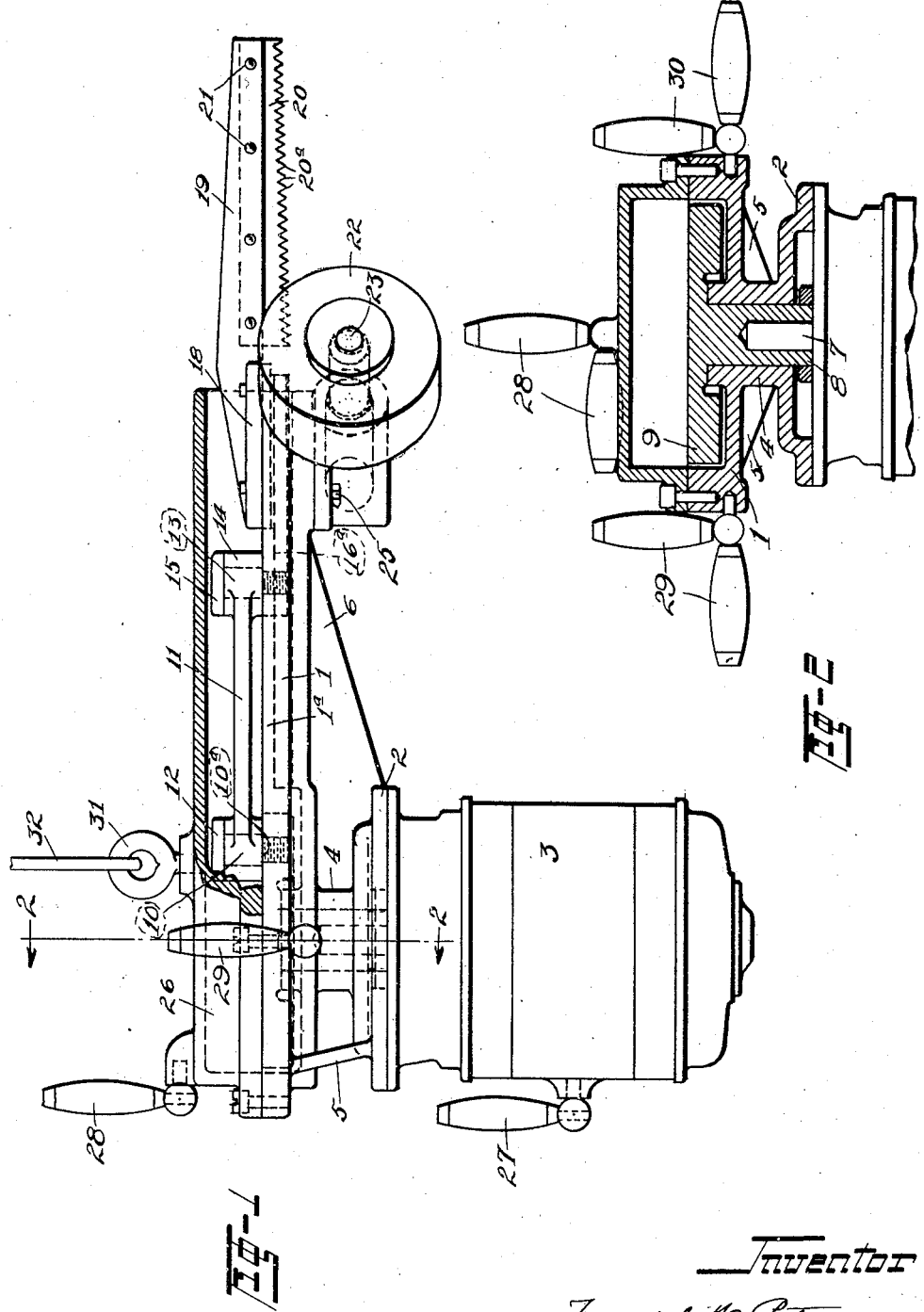
Inventor
Frederick W. Peters,
By Hull, Smith, Brock & West
Attys.

F. W. PETERS.
RECIPROCATING SAW.
APPLICATION FILED MAR. 18, 1918.

1,356,169.

Patented Oct. 19, 1920.
3 SHEETS—SHEET 2.

Inventor
Frederick W. Peters,
By Hull, Smith, Bruck & West.
Attys.

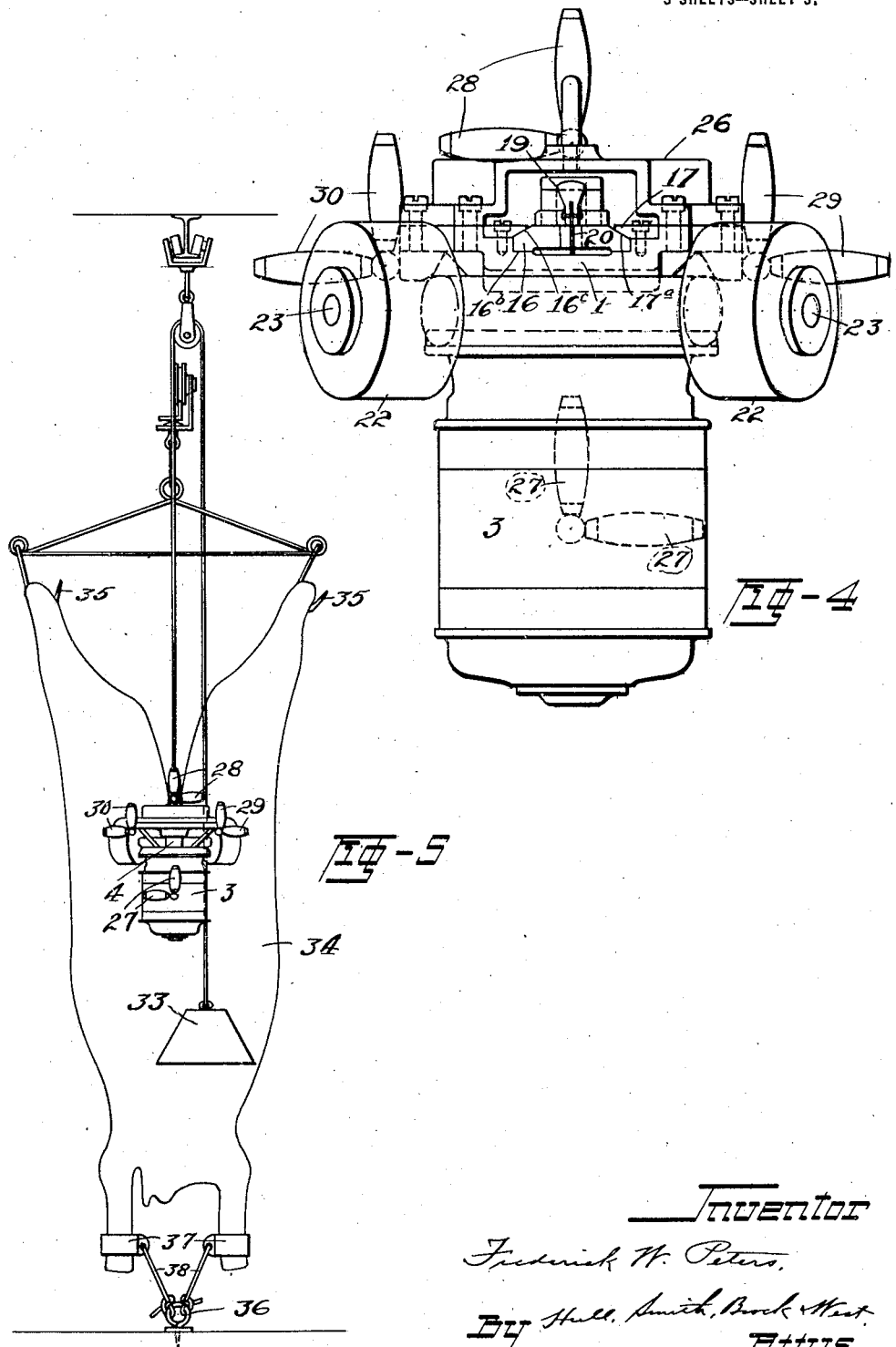

UNITED STATES PATENT OFFICE.

FREDERICK W. PETERS, OF WEST PARK, OHIO, ASSIGNOR TO THE PARAGON MACHINE TOOL & MANUFACTURING COMPANY, OF CLEVELAND, OHIO, A CORPORATION OF OHIO.

RECIPROCATING SAW.

1,356,169.  Specification of Letters Patent.  Patented Oct. 19, 1920.

Application filed March 18, 1918. Serial No. 223,230.

*To all whom it may concern:*

Be it known that I, FREDERICK W. PETERS, a citizen of the United States, residing at West Park, in the county of Cuyahoga and State of Ohio, have invented a certain new and useful Improvement in Reciprocating Saws, of which the following is a full, clear, and exact description, reference being had to the accompanying drawings.

This invention relates to machines for splitting carcasses of animals and has for its general object to provide a machine of this kind which will be capable of splitting a carcass with extreme accuracy and speed: which may be conveniently manipulated and positioned with reference to the carcass; and which is comparatively simple in construction and inexpensive of production.

Further and other objects of the invention will appear in connection with the detailed description hereinafter; and the various objects will be realized in and through the combinations of elements embodied in the claims hereto annexed.

In the drawings forming part hereof, Figure 1 represents a side elevation, with parts broken away, of a machine constructed in accordance with my invention; Fig. 2 a sectional elevation corresponding substantially to the line 2—2 of Fig. 1; Fig. 3 is a plan view of the machine, with parts broken away; Fig. 4 a front elevation of said machine; and Fig. 5 a diagrammatic view showing the manner of suspending a carcass and the position of the machine in operative relation thereto.

The machine illustrated herein comprises generally a reciprocating saw, a motor for driving the same, connections between said motor and said saw, a positioning and backing device adapted to engage the back of the carcass which is being operated upon by the saw, and means whereby the said machine may be conveniently manipulated.

Describing the various parts illustrated herein by reference characters, 1 denotes a supporting frame or bed plate, preferably formed as a casting and serving to support the motor, the saw and its cross head, the positioning and backing device, and the mechanism for transmitting the motion of the motor armature shaft to the cross head. The casting is shown as having formed therewith the cover 2 for the housing 3 of an electric motor, the cover and the bed plate being connected by means of a journal sleeve 4. The rear of the cover 2 and the bed plate are shown as connected by braces 5, there being a brace rib 6 extending forwardly from the cover and connecting the same with the longitudinal central portion of the bed plate. The braces 5 and 6 are arranged preferably about 120° apart. All of the parts thus described are preferably formed from an integral casting.

7 denotes the armature shaft which is rigidly secured to a downwardly projecting crank shaft 8 mounted within the bearing 4 and rigidly connected (as by being cast) with a combined crank disk and flywheel 9. At a suitable distance from the center of the crank disk is a crank pin 10 which may be threaded into said disk and is shown as provided with a shoulder $10^a$. A connecting rod 11 is sleeved upon the crank pin and is retained in place thereon by means of the bolt head 12 at its opposite end. The connecting rod 11 is sleeved upon a wrist pin 13, the pin 13 having a head 15. This wrist pin is carried by the rear tapered end $16^a$ of a cross head 16 mounted in a slideway $16^b$ provided in the bed 1 (see Figs. 3 and 4). The cross head is retained in operative relation to its slideway by means of plates 17 having beveled inner edges $17^a$ overlapping correspondingly beveled surfaces $16^c$ on the sides of the cross head.

18 denotes the rear portion of a saw carrier frame which may be bolted to the top of the cross head. This saw carrier frame comprises, in addition to the rear member 18, an upwardly and forwardly projecting member 19, which is shown as wedge-shaped in section, the narrow end of the wedge being presented downwardly and the members 18 and 19 being conveniently formed from a single casting. The member 19 is provided with a slot extending upwardly from the bottom thereof for the reception of the saw 20 which may be conveniently secured in place as by means of rivets 21. The teeth $20^a$ of this saw are so shaped as to cut while the saw is being reciprocated in reverse directions.

Coöperating with the saw are the rollers 22. These rollers are mounted on studs 23 projecting from and carried by a pair of angularly disposed supports 24. These supports are preferably made as part of an integral V-shaped casting which may be bolted to the bottom of the bed 1, as indicated at 25. By this construction and arrangement of parts, the rollers are positioned on each side of the saw and are arranged at an inclination which will enable them to operate advantageously against the back of a carcass while the saw is being reciprocated by the motor. The parts 22—24 constitute a backing and positioning device for the carcass to be split.

The bed is provided with a flange 1ª extending upwardly from the sides and rear end thereof, and to this flange there is bolted the top housing 26. For convenience of manipulation, the machine is shown as provided with pairs of operating handles, the handles of each pair being preferably arranged 90° apart. One pair of such handles 27 is shown at the rear of the motor housing 3, another pair 28 at the rear of the top of the housing 26, while two other pairs 29 and 30 are mounted on the opposite sides of the rear portion of the bed 1.

The machine may be made sufficiently light to enable the operation thereof entirely by means of the handles and without the necessity for any support other than that afforded by the handles. However, in order to relieve the operator of the weight of the machine, the housing 26 is shown as provided with an eye-bolt 31 to which a cable 32 may be connected, whereby the cable may be led over a sheave above the machine, there being a counterweight 33 on the opposite end of the cable sufficient to counterbalance the weight of the machine and enable it to be operated without any undue muscular exertion.

In Fig. 5 there is shown diagrammatically the manner of suspending a carcass for operation, the machine being indicated in rear elevation. In this view 34 denotes the carcass which is shown as suspended by means of hooks 35 attached to the hind legs. The bottom of the carcass is secured to a ring 36 on the floor by means of clamps 37 detachably connected to the front legs and ropes, straps or other connecting means 38 securing said clamps to said ring.

Reference has been made heretofore to the wedge shape of the saw carrier 19. As the saw descends through the carcass, this wedge shape of the carrier serves to spread apart the sides of the carcass thereabove and thus to facilitate the cutting and even splitting of the carcass.

During the splitting operation, it will be understood that the rollers 22 are placed in engagement with the back of the carcass, thus facilitating the application of the saw to the central portion of the carcass and serving as a backing for the carcass during the backward stroke of the saw.

By the employment of a machine of the character shown and described herein, a carcass may be split evenly and cleanly.

The clean and even splitting of the carcass insures that the meat will be placed under the highest possible classification commensurate with its quality. Furthermore, this clean and even splitting is accomplished with great rapidity and by means of a simple, effective, and self-contained machine.

Having thus described my invention what I claim is:—

1. In a machine of the character described, the combination of a bed having a slideway, a saw carrier reciprocably mounted in said slideway, a saw on said carrier, a backing device adapted to engage opposite sides of a carcass and carried by said bed, a motor carried by said bed, and driving connections, also carried by said bed, between said motor and said saw carrier.

2. In a machine of the character described, the combination of a reciprocating saw carrier, a saw on said carrier, a backing device adapted to engage opposite sides of a carcass, a motor, and driving connections between said motor and said saw carrier.

3. A self-contained machine of the character described comprising a bed, a reciprocating splitting device mounted on said bed, a motor mounted on said bed, driving connections between said motor and said splitting device, a backing device coöperating with the splitting device and supported by said bed, and operating handles also carried by said bed.

4. A self-contained machine of the character described comprising a bed, a reciprocating splitting device mounted on said bed, a carcass backing device also mounted on said bed, a motor mounted on said bed, driving connections between said motor and said splitting device, a housing connected to said bed and having a suspending device, and a plurality of handles for operating said machine.

5. A self-contained machine of the character described comprising a reciprocating splitting device, a carcass backing device extending on opposite sides of said splitting device, a motor, driving connections between said motor and said splitting device, and a plurality of handles for operating said machine.

6. A self-contained machine of the character described comprising a bed, a reciprocating saw mounted on said bed, a backing device comprising a pair of rollers located on opposite sides of said saw and carried by said bed, a motor carried by said bed, driving connections between said motor and said saw, a housing connected to said bed, a suspending device on said housing, and handles for operating said machine.

7. A machine of the character described comprising a reciprocating saw, a backing device comprising a pair of rollers located on opposite sides of said saw, a motor, driving connections between said motor and said saw, a suspending device for said machine, and handles for operating said machine.

8. In a machine of the character described, the combination of a reciprocatory saw, a roller support extending forwardly on each side of said saw, and a roller on each of said supports.

9. In a machine of the character described, the combination of a reciprocatory saw, a V-shaped supporting device arranged in operative relation to said saw and having its branches extending forwardly on opposite sides of said saw, and a roller carried by each of said branches.

10. A self-contained machine of the character described comprising a reciprocatory splitting device, a motor for reciprocating the said device, a support for said motor and splitting device, and a backing member carried by said support and extending on each side of said splitting device and adapted to engage a carcass operated upon by said device.

11. A self-contained machine of the character described comprising a support, a reciprocatory saw on said support, and a backing member extending forwardly from said support on each side of said saw and adapted to engage a carcass operated upon by the latter.

In testimony whereof, I hereunto affix my signature.

FREDERICK W. PETERS.